(12) United States Patent
Inoue

(10) Patent No.: US 11,210,385 B2
(45) Date of Patent: Dec. 28, 2021

(54) ELECTRONIC APPARATUS AND CONTROL METHOD

(71) Applicant: CANON KABUSHIKI KAISHA, Tokyo (JP)

(72) Inventor: Hajime Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 16/045,192

(22) Filed: Jul. 25, 2018

(65) Prior Publication Data

US 2019/0033937 A1 Jan. 31, 2019

(30) Foreign Application Priority Data

Jul. 27, 2017 (JP) .............................. JP2017-145680

(51) Int. Cl.
| | |
|---|---|
| G06F 21/44 | (2013.01) |
| G06F 1/26 | (2006.01) |
| H01M 10/44 | (2006.01) |
| G06F 21/81 | (2013.01) |
| H02J 7/00 | (2006.01) |
| H01M 10/42 | (2006.01) |

(52) U.S. Cl.
CPC .............. *G06F 21/44* (2013.01); *G06F 1/26* (2013.01); *G06F 21/81* (2013.01); *H01M 10/44* (2013.01); *H02J 7/0031* (2013.01); *H02J 7/00038* (2020.01); *H02J 7/00045* (2020.01); *H01M 2010/4278* (2013.01); *H01M 2220/30* (2013.01)

(58) Field of Classification Search
CPC . G06F 21/44; G06F 21/81; G06F 1/26; G06F 1/263; H02J 7/0031; H02J 7/0036; H02J 7/0045; H02J 7/00038; H02J 7/00045; H01M 2010/4278; H01M 2020/30; H01M 10/425; H01M 10/44; H01M 2220/30
See application file for complete search history.

(56) References Cited

U.S. PATENT DOCUMENTS

| 2007/0260892 A1* | 11/2007 | Paul | ..................... H02J 7/00036 713/193 |
| 2009/0256717 A1* | 10/2009 | Iwai | ......................... G06F 1/26 340/5.8 |
| 2014/0078530 A1* | 3/2014 | Lee | ......................... G06F 21/81 358/1.13 |
| 2015/0089630 A1* | 3/2015 | Lee | ..................... B41J 2/17546 726/16 |

(Continued)

FOREIGN PATENT DOCUMENTS

JP 2009-195014 A 8/2009

*Primary Examiner* — Jeremy S Duffield
(74) *Attorney, Agent, or Firm* — Cowan, Liebowitz & Latman, P.C.

(57) ABSTRACT

An electronic apparatus comprises a first battery authentication unit that performs a battery authentication process for authenticating a battery pack connected to the electronic apparatus, a second battery authentication unit that performs the battery authentication process, a first control unit that performs an activation process and controls the first battery authentication unit to perform the battery authentication process after the activation process ends, and a second control unit that controls the second battery authentication unit to perform the battery authentication process while the first control unit is performing the activation process.

11 Claims, 10 Drawing Sheets

(56) References Cited

U.S. PATENT DOCUMENTS

| | | | |
|---|---|---|---|
| 2015/0189168 A1* | 7/2015 | Tanaka | H04N 5/23293 |
| | | | 348/231.6 |
| 2017/0053501 A1* | 2/2017 | Kamiwano | G06F 21/44 |
| 2017/0103197 A1* | 4/2017 | Degura | G06F 21/81 |

* cited by examiner

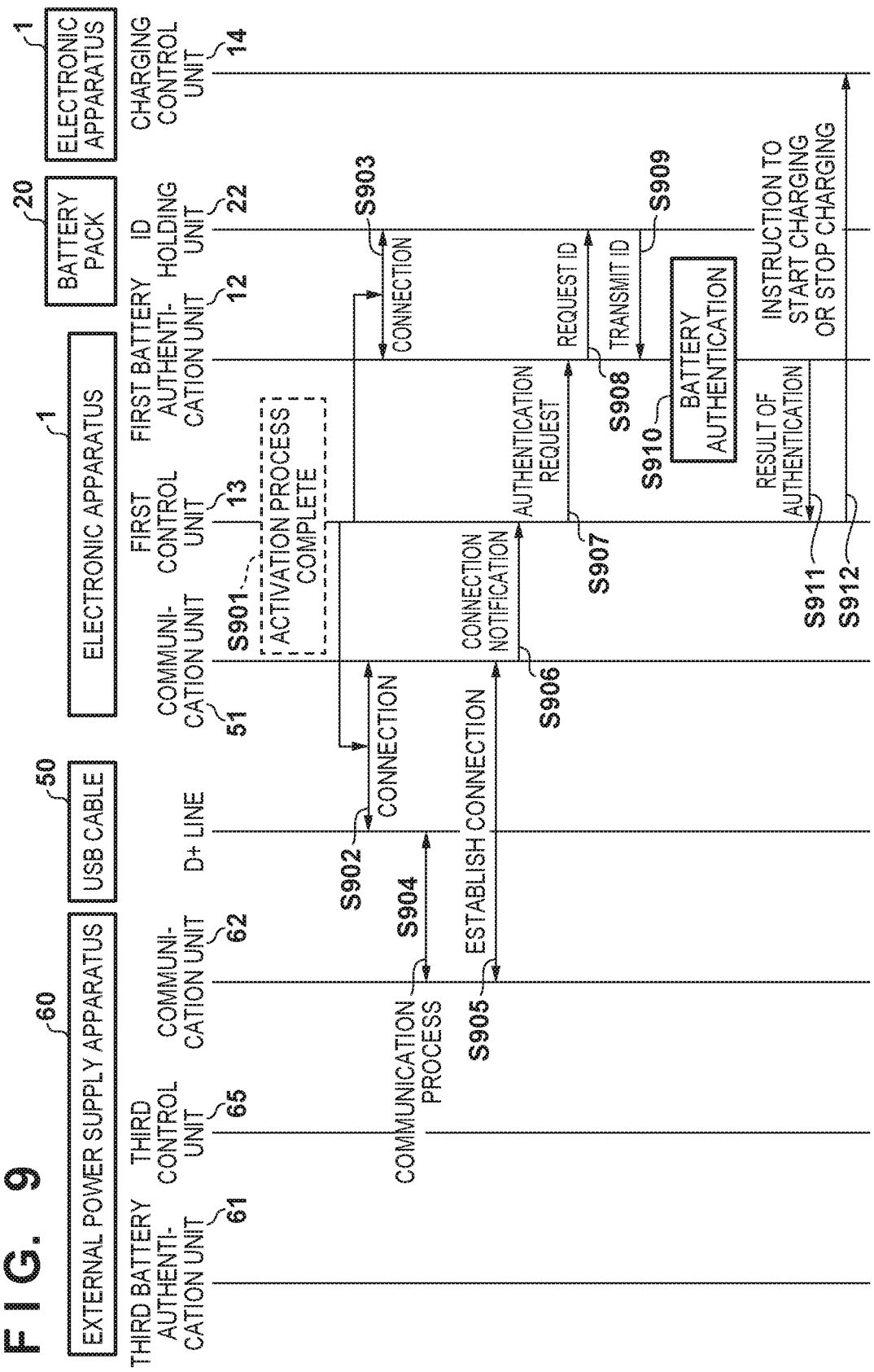

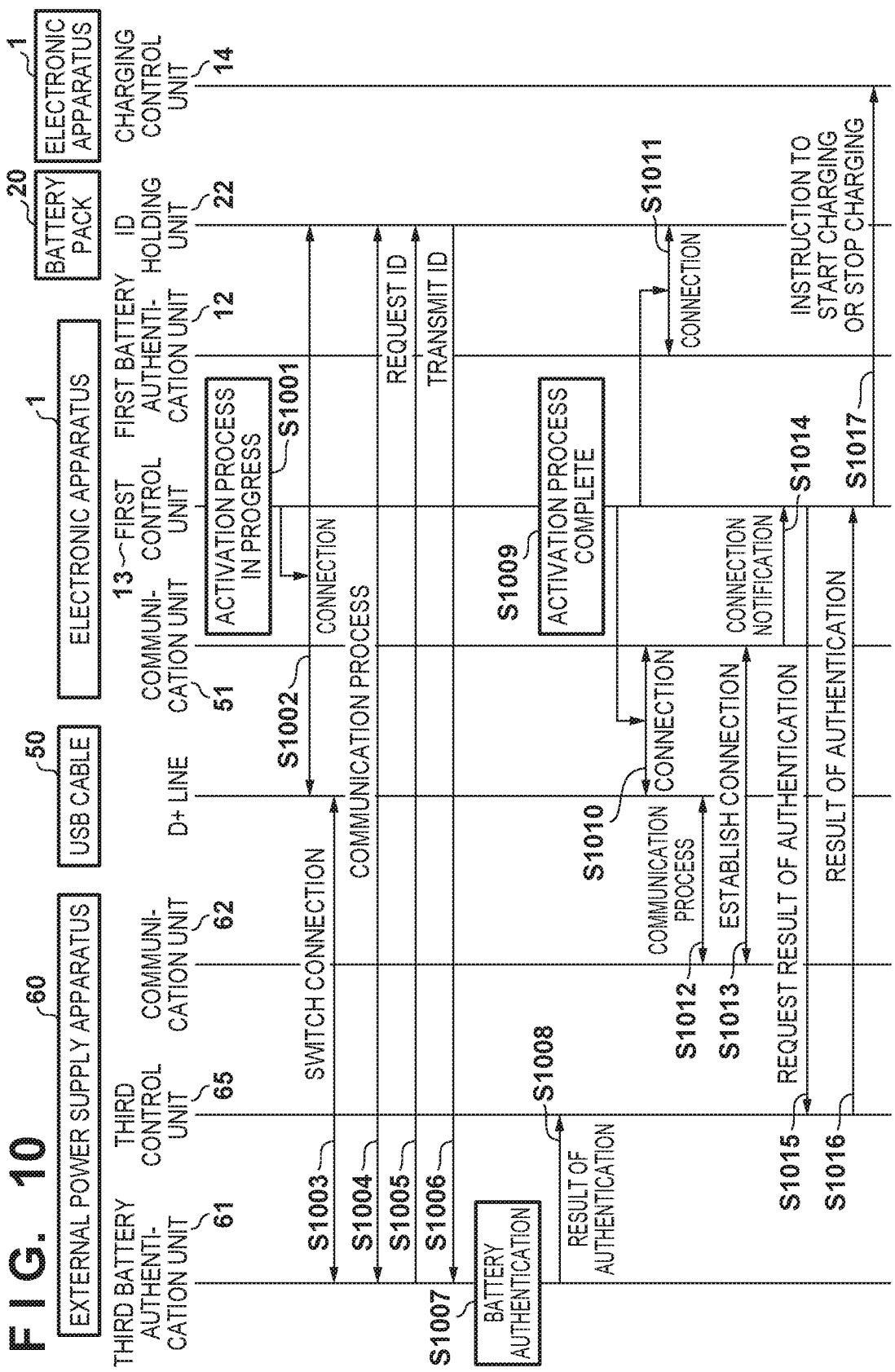

ELECTRONIC APPARATUS AND CONTROL METHOD

BACKGROUND

Field of the Invention

Aspects of the disclosure generally relate to an electronic apparatus to which a battery pack is connected, a control method, a program, and so on.

Description of the Related Art

Electronic apparatuses such as digital cameras are provided with a battery authentication function, which is the function of determining whether or not a battery pack connected to the electronic apparatuses is a genuine battery pack. Japanese Patent Laid-Open No. 2009-195014 discloses a method that employs the battery authentication function to allow a battery pack to be charged when the battery pack is determined as a genuine battery pack.

It is envisaged that, if a battery authentication process is performed while the activation process for activating the electronic apparatus is being performed, a processing load related to the activation process increases, and the activation process takes a longer time. For example, in a case where the electronic apparatus is an image capture apparatus, if the activation process for activating the electronic apparatus takes a longer time, it is more likely to miss a good opportunity for a photograph.

SUMMARY

According to an aspect of the embodiments, an apparatus, a system, a method, a program, or the like that reduce a processing load related to the activation process for activating an electronic apparatus to prevent the activation process from taking a long time, are provided.

According to an aspect of the embodiments, there is provided an electronic apparatus comprising: a first battery authentication unit that performs a battery authentication process for authenticating a battery pack connected to the electronic apparatus; a second battery authentication unit that performs the battery authentication process; a first control unit that performs an activation process and controls the first battery authentication unit to perform the battery authentication process after the activation process ends; and a second control unit that controls the second battery authentication unit to perform the battery authentication process while the first control unit is performing the activation process.

According to an aspect of the embodiments, there is provided a method comprising: causing a first battery authentication unit to perform a battery authentication process for authenticating a battery pack connected to an electronic apparatus; causing a second battery authentication unit to perform the battery authentication process; causing a first control unit to perform an activation process and control the first battery authentication unit to perform the battery authentication process after the activation process ends; and causing a second control unit to control the second battery authentication unit to perform the battery authentication process while the first control unit is performing the activation process.

According to an aspect of the embodiments, there is provided a non-transitory storage medium that stores a program causing a computer to execute a method, the method comprising: causing a first battery authentication unit to perform a battery authentication process for authenticating a battery pack connected to an electronic apparatus; causing a second battery authentication unit to perform the battery authentication process; causing a first control unit to perform an activation process and control the first battery authentication unit to perform the battery authentication process after the activation process ends; and causing a second control unit to control the second battery authentication unit to perform the battery authentication process while the first control unit is performing the activation process.

Further aspects of the embodiments will become apparent from the following embodiments.

BRIEF DESCRIPTION OF THE DRAWINGS

FIG. 9 is a diagram illustrating operations of the external power supply apparatus 60, the electronic apparatus 1, and the battery pack 20 in a case where an activation signal has not been input to the first control unit 13.

FIG. 10 is a diagram illustrating operations of the external power supply apparatus 60, the electronic apparatus 1, and the battery pack 20 in a case where an activation signal has been input to the first control unit 13.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

The following describes an electronic apparatus 1 according to the first embodiment and a method for controlling the same.

Figure 1:
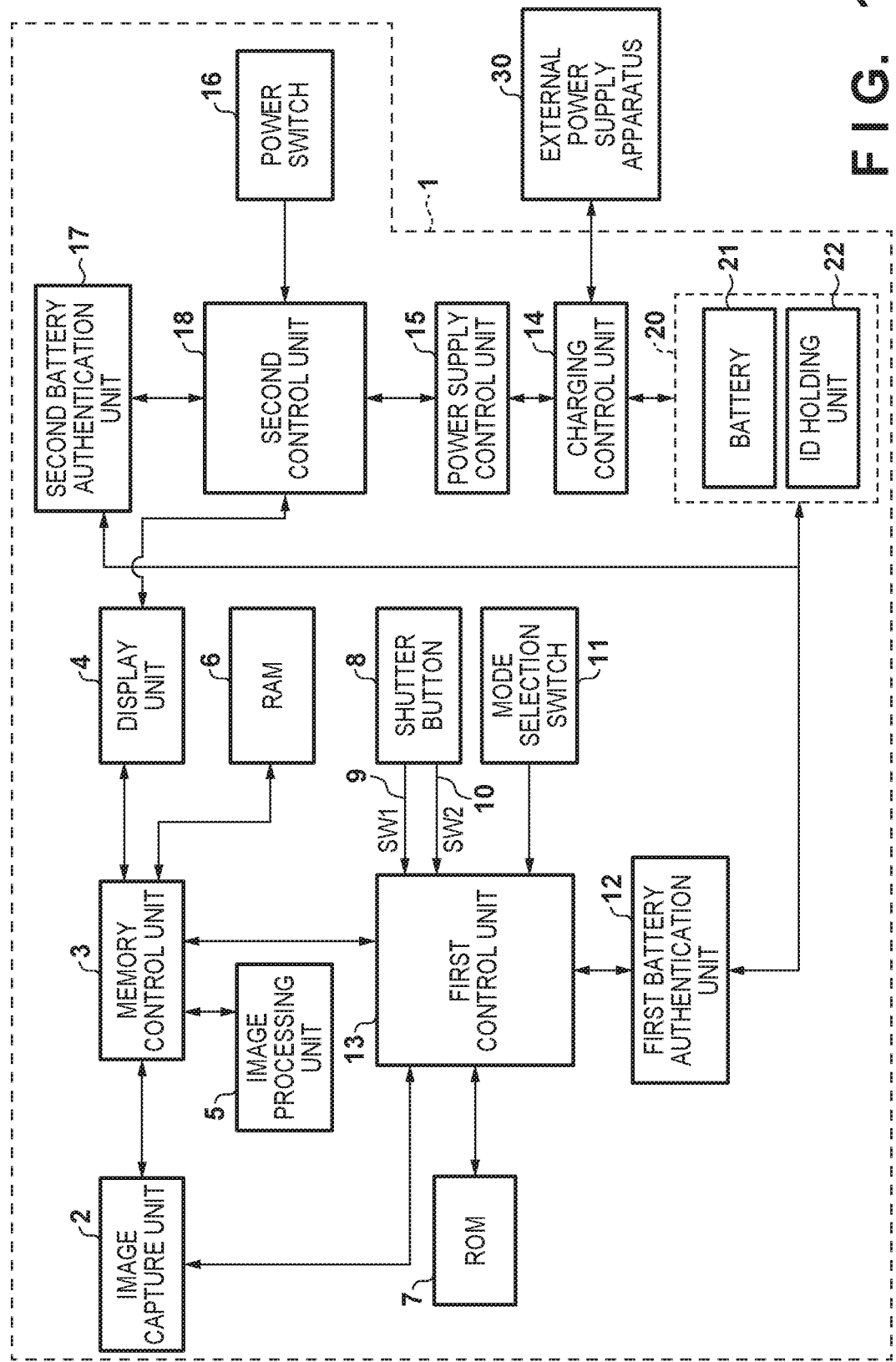
FIG. 1 is a block diagram illustrating components of an electronic apparatus 1 according to a first embodiment.

FIG. 1 is a block diagram illustrating components of the electronic apparatus 1 according to the first embodiment.

The electronic apparatus 1 is a portable apparatus, and is an apparatus that can operate as at least one of an image capture apparatus (e.g. a digital camera) and a mobile phone (e.g. a smartphone).

As shown in FIG. 1, the electronic apparatus 1 includes an image capture unit 2, a memory control unit 3, a display unit 4, an image processing unit 5, a RAM 6, a ROM 7, a shutter button 8, a mode selection switch 11, a first battery authentication unit 12, and a first control unit 13. The electronic apparatus 1 further includes a charging control unit 14, a power supply control unit 15, a power switch 16, a second battery authentication unit 17, a second control unit 18, and a battery pack 20. The battery pack 20 is detachable from the electronic apparatus 1.

The image capture unit 2 includes, for example: an image sensor that is constituted by a CCD or a CMOS and converts an optical image of a subject to image signals; and an A/D converter that converts image signals output from the image sensor to digitized image data. Thus, the image capture unit 2 can generate image data corresponding to a captured image (a still image or a moving image).

The image processing unit 5 performs predetermined pixel interpolation, a resize process, and a color conversion process on image data output from the image capture unit 2 or the memory control unit 3. Also, the image processing unit 5 performs a predetermined computation process using image data generated by the image capture unit 2, and supplies the first control unit 13 with the result of computation thus obtained. The first control unit 13 performs exposure control and metering control based on the result of computation supplied from the image processing unit 5. Thus, the first control unit 13 can perform an AF (Automatic Focus) process, an AE (Automatic Exposure) process, and an EF (pre-flash emission). The image processing unit 5 further performs a predetermined computation process, using image data generated by the image capture unit 2, and performs an AWB (Automatic White Balance) process based on the result of computation thus obtained.

Output data from the image capture unit 2 is written in the RAM 6 via the image processing unit 5 and the memory control unit 3 or via the memory control unit 3. The RAM 6 stores image data generated by the image capture unit 2 and image data that is to be displayed on the display unit 4. The RAM 6 has a store capacity that is sufficient to store a predetermined number of still images and a moving image and audio having a predetermined duration.

The RAM 6 further operates as an image display memory (a video memory). Image data written in the RAM 6 is converted to analogue signals and is thus displayed on the display unit 4. The display unit 4 includes a display device such as a liquid crystal display or an organic EL display. The display unit 4 operates as an electronic view finder by displaying, in real time, image data generated by the image capture unit 2. Thus, the display unit 4 can display a live view image.

The ROM 7 is a non-volatile memory (e.g. EEPROM). The ROM 7 stores programs for controlling each of the components of the electronic apparatus 1. The programs stored in the ROM 7 include a program for controlling operations of the electronic apparatus 1 described below.

The first control unit 13 includes a processor that executes a program stored in the ROM 7 to control each of the components of the electronic apparatus 1. The processor of the first control unit 13 is a hardware processor, for example.

The shutter button 8 is an operation member that is used to provide a shooting preparation instruction or a shooting instruction. The shutter button 8 includes a first shutter switch 9 and a second shutter switch 10. Upon the shutter button 8 being pressed halfway, the first shutter switch 9 is turned ON and outputs a first signal SW1 (corresponding to the shooting preparation instruction) to the first control unit 13. The first control unit 13 performs an AF process, an AE process, an AWB process, an EF process, and so on according to the first signal SW1 from the first shutter switch 9.

Upon the shutter button 8 being fully pressed, the second shutter switch 10 is turned ON and outputs a second signal SW2 (corresponding to the shooting instruction) to the first control unit 13. The first control unit 13 causes the image capture unit 2 to capture an image, generates image data corresponding to the captured image generated by the image capture unit 2, and records the image data to a recording medium according to the second signal SW2 from the second shutter switch 10.

The mode selection switch 11 is an operational member that is used to switch the operation mode of the electronic apparatus 1 to a still image shooting mode, a moving image recording mode, or a reproducing mode.

The first battery authentication unit 12 has a battery authentication function, which is the function of determining whether the battery pack 20 connected to the electronic apparatus 1 is a genuine battery pack or a non-genuine battery pack. The battery pack 20 includes a battery 21 and an ID holding unit 22. The battery 21 is a rechargeable battery (e.g. a lithium ion battery). The ID holding unit 22 includes a memory that holds an ID (identification information) that is unique to the battery pack 20, and a communication IC that transmits the ID held in the memory to the first battery authentication unit 12 and the second battery authentication unit 17.

The first battery authentication unit 12 reads out, for example, the ID of the battery pack 20 from the ID holding unit 22 of the battery pack 20, acquires the ID stored in the ROM 7, and compares these two IDs with each other to perform a battery authentication process regarding the battery pack 20. Then, if these two IDs match with each other, the first battery authentication unit 12 determines that the battery pack 20 is a genuine battery pack, and if these two IDs do not match each other, the first battery authentication unit 12 determines that the battery pack 20 is a non-genuine battery pack.

Upon the first battery authentication unit 12 determining that the battery pack 20 is a genuine battery pack, the first control unit 13 electrically connects the battery 21 to the electronic apparatus 1, and allows the battery 21 to be discharged or charged. Upon the first battery authentication unit 12 determining that the battery pack 20 is a non-genuine battery pack, the first control unit 13 provides the user with a warning indicating that a non-genuine battery pack is connected, electrically disconnects the battery 21 and the electronic apparatus 1 from each other, and inhibits the battery 21 from being charged.

The second control unit 18 includes a memory that stores programs that are used to control the charging control unit 14, the power supply control unit 15, the second battery authentication unit 17, the display unit 4, and so on, and a processor that executes programs stored in the memory to control the charging control unit 14, the power supply control unit 15, the second battery authentication unit 17, the display unit 4, and so on. The processor of the second control unit 18 is a hardware processor, for example.

The second battery authentication unit 17 reads out, for example, the ID of the battery pack 20 from the ID holding unit 22 of the battery pack 20, acquires the ID stored in the ROM 7, and compares these two IDs with each other to perform a battery authentication process regarding the battery pack 20. Then, if these two IDs match each other, the second battery authentication unit 17 determines that the battery pack 20 is a genuine battery pack, and if these two IDs do not match each other, the second battery authentication unit 17 determines that the battery pack 20 is a non-genuine battery pack.

The power supply control unit 15 includes different detection circuits, a DC-DC converter, and so on, and detects whether or not a battery 21 is connected, the type of the battery 21, and the remaining amount of the battery 21. Also, the power supply control unit 15 controls the DC-DC converter based on the result of detection regarding the battery 21 and an instruction from the second control unit 18, and supplies each of the components of the electronic apparatus 1 with a required voltage.

An external power supply apparatus 30 operates as, for example, an AC adapter (or an AC-USB adapter) that converts AC power to DC power, and supplies the electronic apparatus 1 with DC power via a USB (Universal Serial Bus) cable. The external power supply apparatus 30 is detachable from the electronic apparatus 1. The charging control unit 14 controls charging to the battery 21, using power supplied from the external power supply apparatus 30. The charging control unit 14 manages whether power for operating the electronic apparatus 1 is to be supplied from the battery 21 or from the external power supply apparatus 30.

The power switch 16 is an operation member that switches the electronic apparatus 1 to a power ON state or a power OFF state (or a power saving state).

The second control unit 18 controls the electronic apparatus 1 from when the power switch 16 is turned ON to when the activation process performed by the first control unit 13 is complete. Also, while the first control unit 13 is performing the activation process, the second control unit 18 performs a battery authentication process regarding the battery pack 20 instead of the first control unit 13, using the second battery authentication unit 17. The second control unit 18 monitors the state of the power switch 16, and upon the power switch 16 being turned ON, the second control unit 18 instructs the power supply control unit 15 to start up a power supply voltage. After confirming that the power supply voltage has been started up, the second control unit 18 cancels the reset state of the first control unit 13. Note that the processing load on the second control unit 18 is lower than that on the first control unit 13, and the activation process performed by the second control unit 18 after the power switch 16 has been turned ON is complete upon the instruction to start up the power supply voltage being provided.

Figure 2:
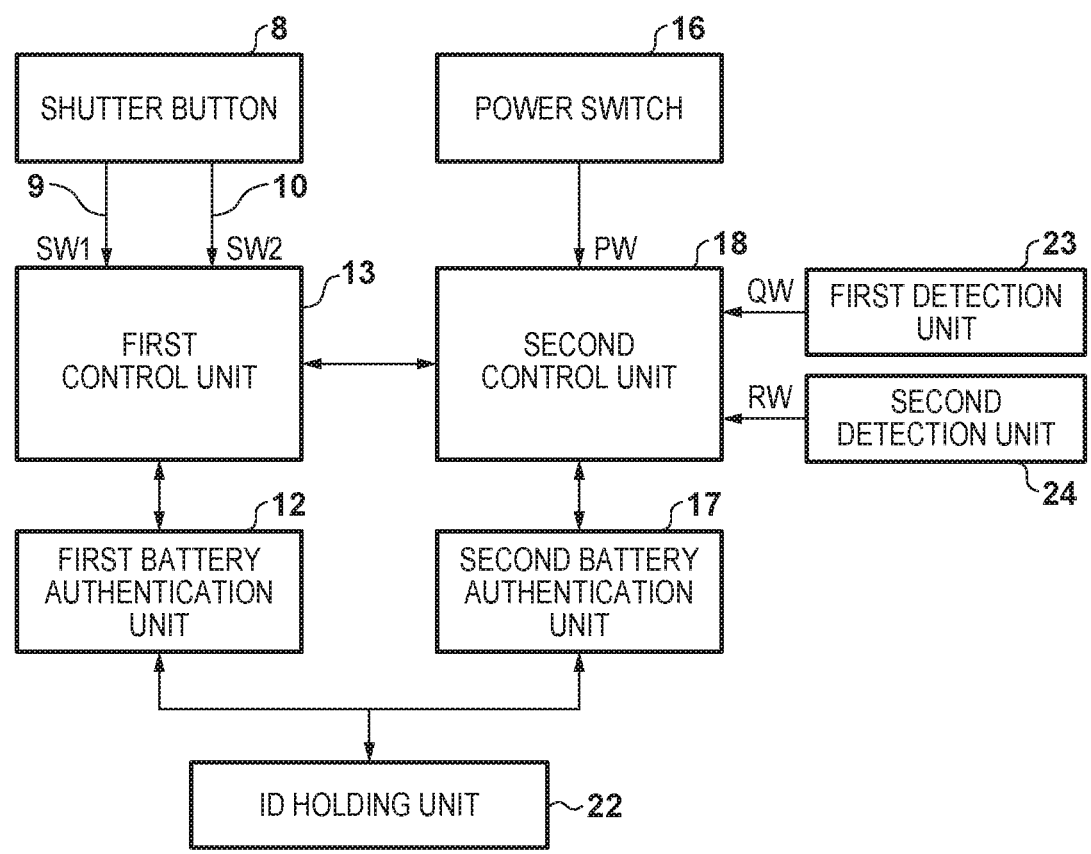
FIG. 2 is a block diagram illustrating a first battery authentication unit 12, a first control unit 13, a second battery authentication unit 17, and a second control unit 18.

Next, with reference to FIG. 2, the following describes operations of the first battery authentication unit 12 and the first control unit 13, and operations of the second battery authentication unit 17 and the second control unit 18.

Both the first battery authentication unit 12 and the second battery authentication unit 17 have a communication function, which is the function of communicating with the ID holding unit 22. The ID holding unit 22 has a communication function, which is the function of communicating with the first battery authentication unit 12 and the second battery authentication unit 17. A communication scheme employed by the first battery authentication unit 12, the second battery authentication unit 17, and the ID holding unit 22 is a serial communication scheme such as that employed by the I2C (Inter-Integrated Circuit), and through which encrypted data is transmitted.

Power for driving the first control unit 13 and the ID holding unit 22 is supplied from the battery 21 or from the external power supply apparatus 30. The first control unit 13 issues an authentication request to the first battery authentication unit 12. Upon receiving the authentication request, the first battery authentication unit 12 compares the above-described two IDs with each other to determine whether or not the battery pack 20 is a genuine battery pack.

The second control unit 18 issues an authentication request to the second battery authentication unit 17. Upon receiving the authentication request, the second battery authentication unit 17 compares the above-described two IDs with each other to determine whether or not the battery pack 20 is a genuine battery pack.

An activation signal that is input to the first control unit 13 is a first signal SW1 or a second signal SW2 depending on what operation is performed using the shutter button 8. The first control unit 13 performs shooting preparation operations if the first signal SW1 is input thereto, and performs shooting operations if the second signal SW2 is input thereto.

An activation signal that is input to the second control unit 18 is a signal PW, which indicates that the power switch 16 has been turned ON, a signal QW, which indicates that the state of a battery cover has changed from an open state to a closed state, or a signal RW, which indicates that the external power supply apparatus 30 is connected via a USB cable. The battery cover is a cover that is provided for a housing unit that is used to store the battery pack 20 in the electronic apparatus 1.

The signal PW, which indicates that the power switch 16 has been turned ON, is input from the power switch 16 to the second control unit 18. Whether or not the state of the battery cover has changed from an open state to a closed state is detected by a first detection unit 23. The signal QW, which indicates that the state of the battery cover has changed from an open state to a closed state, is input from the first detection unit 23 to the second control unit 18. Whether or not an external apparatus is connected is detected by a second detection unit 24. The signal RW, which indicates that an external apparatus is connected, is input from the second detection unit 24 to the second control unit 18.

Upon the signal PW, which indicates that the power switch 16 has been turned ON, being input, or upon the signal QW, which indicates that the state of the battery cover has changed from an open state to a closed state, being input from the first detection unit 23, the second control unit 18 instructs the power supply control unit 15 to start up a power supply voltage. Then, after confirming that a power supply voltage has been started up, the second control unit 18 transmits a reset cancellation signal to the first control unit 13. Upon receiving the reset cancellation signal, the first control unit 13 starts an activation process. While the first control unit 13 is performing an activation process, the second control unit 18 performs a battery authentication process regarding the battery pack 20, using the second battery authentication unit 17, and notifies the first control unit 13 of the result of battery authentication process. The first control unit 13 determines whether or not the battery pack 20 is a genuine battery pack based on the result of battery authentication process. If the battery pack 20 is determined as a genuine battery pack, the first control unit 13 transitions to a normal operation state (e.g. a state in which shooting can be performed in response to a user instruction) without providing the user with a predetermined warning. If the battery pack 20 is determined as a non-genuine battery pack, the first control unit 13 provides the user with a predetermined warning, and transitions to a normal operation state upon a predetermined period of time elapsing.

Upon the battery pack 20 being connected to the electronic apparatus 1 and the signal RW, which indicates that an external apparatus is connected, being input from the second detection unit 24 before the activation process performed by the first control unit 13 has been completed, the second control unit 18 performs the same control as described above instead of the first control unit 13. Upon the signal RW, which indicates that an external apparatus is connected, being input from the second detection unit 24 after the activation process performed by the first control unit 13 has been completed, the first control unit 13 performs a battery authentication process regarding the battery pack 20, using the first battery authentication unit 12.

Figure 3:
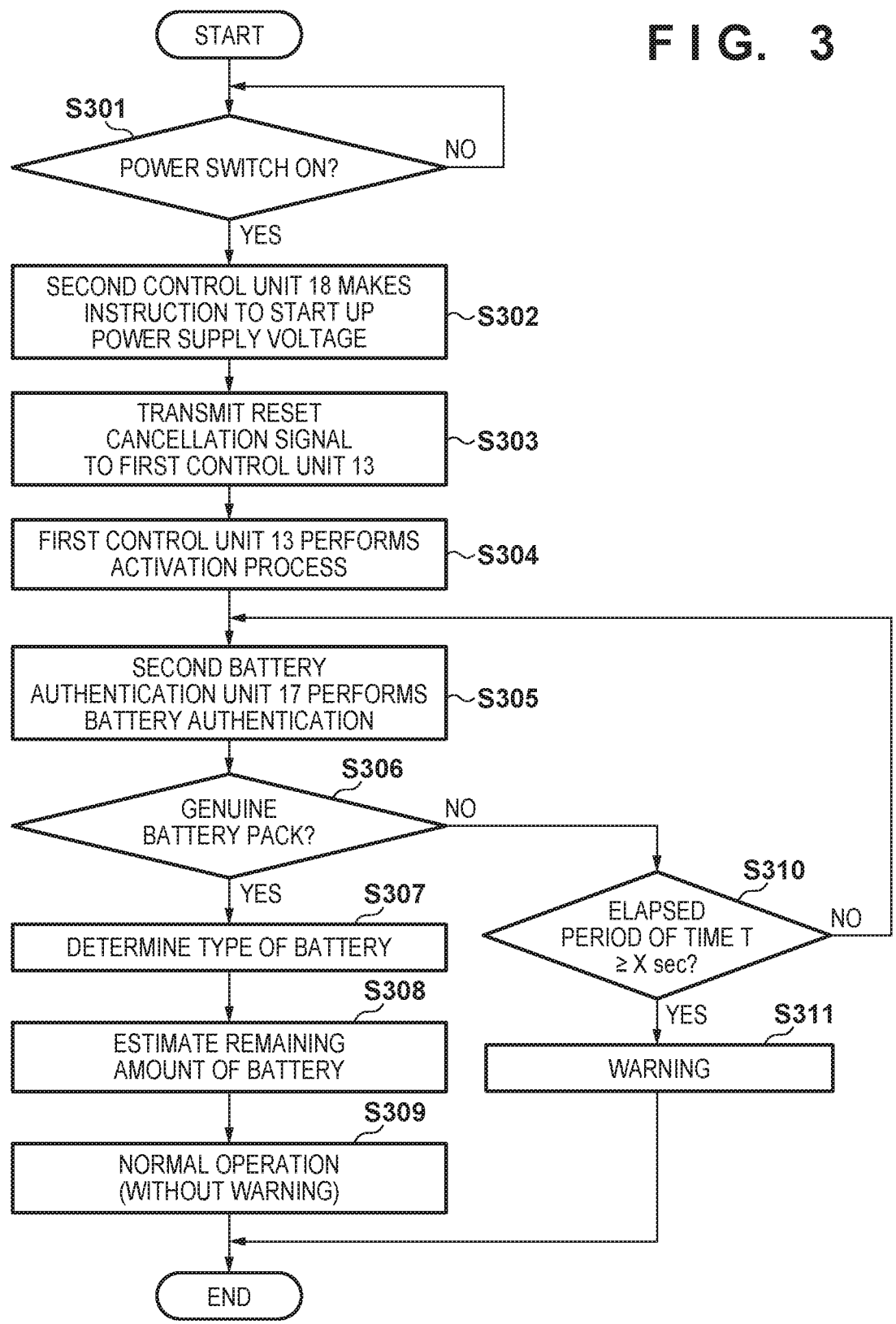
FIG. 3 is a flowchart illustrating an example in which a battery authentication process is performed while the first control unit 13 is performing an activation process.
Figure 4:
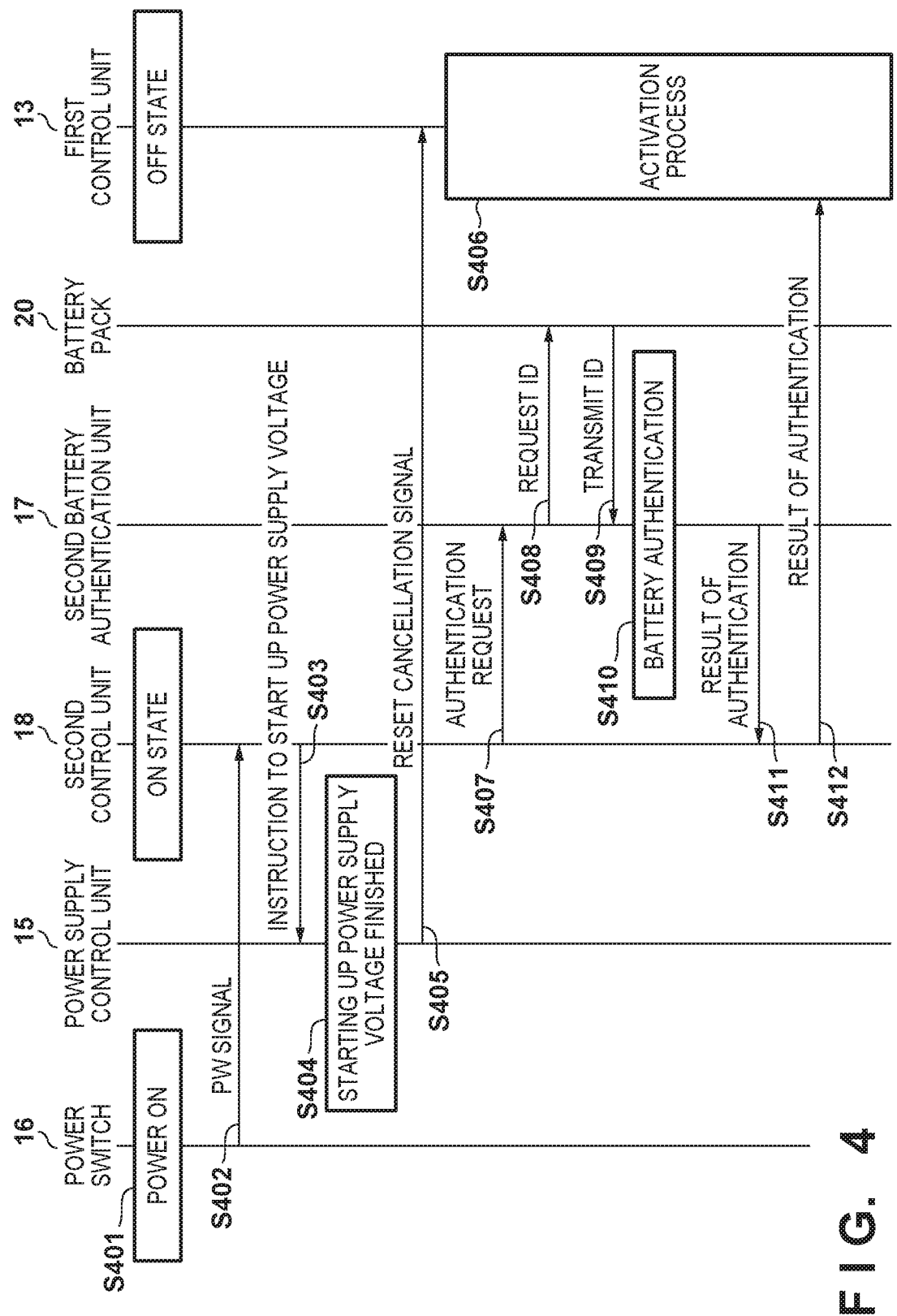
FIG. 4 is a sequence diagram illustrating operations of a power switch 16, a power supply control unit 15, the first control unit 13, the second control unit 18, the second battery authentication unit 17, and a battery pack 20 shown in FIG. 3.

Next, with reference to FIGS. 3 and 4, the following describes an example in which a battery authentication process is performed while the activation process is being performed by the first control unit 13.

FIG. 3 is a flowchart illustrating an example in which a battery authentication process is performed while an activation process is being performed by the first control unit 13.

In steps S301 to S303 in FIG. 3, if the power switch 16 is turned ON, the second control unit 18 instructs the power supply control unit 15 to start up a power supply voltage, and after confirming that a power supply voltage has been started up, the second control unit 18 transmits a reset cancellation signal to the first control unit 13.

In step S304, the first control unit 13 receives the reset cancellation signal, and starts an activation process.

In step S305, instead of the first control unit 13 that is performing an activation process, the second control unit 18 performs a battery authentication process regarding the battery pack 20, using the second battery authentication unit 17.

In step S306, the second control unit 18 determines whether or not the battery pack 20 is a genuine battery pack, based on the result of the battery authentication process performed in step S305. If it is determined that the battery pack 20 is a genuine battery pack, the second control unit 18 proceeds to step S307. If it is determined that the battery pack 20 is a non-genuine battery pack, the second control unit 18 proceeds to step S310.

In step S307, the second control unit 18 causes the power supply control unit 15 to determine the type of the battery 21 based on the ID of the battery pack 20. Information indicating the type of the battery 21 determined by the power supply control unit 15 is notified to the second control unit 18.

In step S308, the second control unit 18 causes the power supply control unit 15 to calculate the remaining amount of the battery 21 based on a voltage across the battery 21. Information indicating the remaining amount of the battery 21 calculated by the power supply control unit 15 is notified to the second control unit 18.

In step S309, the second control unit 18 performs normal operations. While performing normal operations, the second control unit 18 controls the display unit 4 so that information corresponding to the remaining amount of the battery 21 is displayed on the display unit 4.

In step S310, the second control unit 18 determines whether or not an elapsed period of time T that has elapsed after a battery authentication process has been started in step S305 has reached a predetermined period of time X. If it is determined that the elapsed period of time T of the battery authentication process has reached the predetermined period of time X (sec), the second control unit 18 proceeds to step S311. If it is determined that the elapsed period of time T has not reached the predetermined period of time X (sec), the second control unit 18 returns to step S305, and performs a retry operation to retry the battery authentication process. In this way, even if a battery authentication process fails, a retry operation is performed upon a predetermined period of time elapsing after the battery authentication process has been started, in order to prevent the battery pack 20 that is a genuine battery pack from being determined as a non-genuine battery pack due to a communication error or the like occurring in the ID holding unit 22 for some reason.

In step S311, the second control unit 18 provides the user with a warning indicating that a non-genuine battery pack is used. This warning is provided by displaying, on the display unit 4, information indicating that a non-genuine battery pack is used.

Next, with reference to FIG. 4, the following describes an operation sequence regarding operations of each of the components of the electronic apparatus 1 shown in the flowchart in FIG. 3.

FIG. 4 is a sequence diagram illustrating operations of the power switch 16, the power supply control unit 15, the first control unit 13, the second control unit 18, the second battery authentication unit 17, and the battery pack 20 shown in the flowchart in FIG. 3.

Before the power switch 16 is turned ON in step S401, the first control unit 13 is in an OFF state and the second control unit 18 is in an ON state (a power saving state).

Upon the power switch 16 being turned ON by the user in step S401, a power ON signal PW is output from the power switch 16 to the second control unit 18 in step S402. Upon receiving the power ON signal PW, the second control unit 18 instructs the power supply control unit 15 to start up a power supply voltage in step S403.

Upon finishing starting up a power supply voltage in step S404, the power supply control unit 15 transmits a reset cancellation signal to the first control unit 13 in step S405. Upon receiving the reset cancellation signal, the first control unit 13 starts an activation process in step S406. After receiving the reset cancellation signal, the first control unit 13 continues the activation process while the second control unit 18 is performing a battery authentication process. On the other hand, the activation process performed by the second control unit 18 is complete when the second control unit 18 instructs the power supply control unit 15 to start up a power supply voltage in step S403, after receiving the power ON signal PW in step S402. Therefore, upon the activation process performed by the second control unit 18 being complete, the second control unit 18 starts a battery authentication process, using the second battery authentication unit 17. In step S407, the second control unit 18 issues an authentication request to the second battery authentication unit 17. Upon receiving the authentication request, the second battery authentication unit 17 makes a request to the ID holding unit 22 for the ID of the battery pack 20 (step S408). Upon receiving the ID request, the ID holding unit 22 transmits the ID of the battery pack 20 to the second battery authentication unit 17 (step S409).

In step S410, the second battery authentication unit 17 compares the above-described two IDs with each other to determine whether or not the battery pack 20 is a genuine battery pack. Upon completion of the battery authentication process, the second battery authentication unit 17 notifies the second control unit 18 of the result of battery authentication process (step S411). Upon receiving the result of battery authentication process, the second control unit 18 notifies the first control unit 13 of the result of battery authentication process (step S412). The first control unit 13 determines whether or not the battery pack 20 is a non-genuine battery pack based on the result of battery authentication process. Upon determining that the battery pack 20 is a non-genuine battery pack, the first control unit 13 provides the user with a predetermined warning.

Although FIGS. 3 and 4 illustrate an example in which the power ON signal PW is input as an activation signal, an activation signal is not limited to the power ON signal PW, and another activation signal may be input.

As described above, according to the first embodiment, the second control unit 18 performs a battery authentication process regarding the battery pack 20 instead of the first control unit 13 while the first control unit 13 is performing an activation process. As a result, it is possible to reduce a processing load related to the activation process performed by the first control unit 13, and thus it is possible to prevent the activation process from taking a long time. Also, it is possible to prevent the electronic apparatus 1 from stopping due to a sudden drop in a power supply voltage.

Second Embodiment

The following describes an electronic apparatus 1 according to the second embodiment and a method for controlling the same.

In the second embodiment, the electronic apparatus 1 is connected to an external power supply apparatus 60 via a USB cable or the like, and the battery 21 is charged using power from the external power supply apparatus 60. If the battery pack 20 is a non-genuine battery pack, the battery 21 and the electronic apparatus 1 are electrically disconnected, and the battery 21 is inhibited or restricted from being charged.

Figure 5:
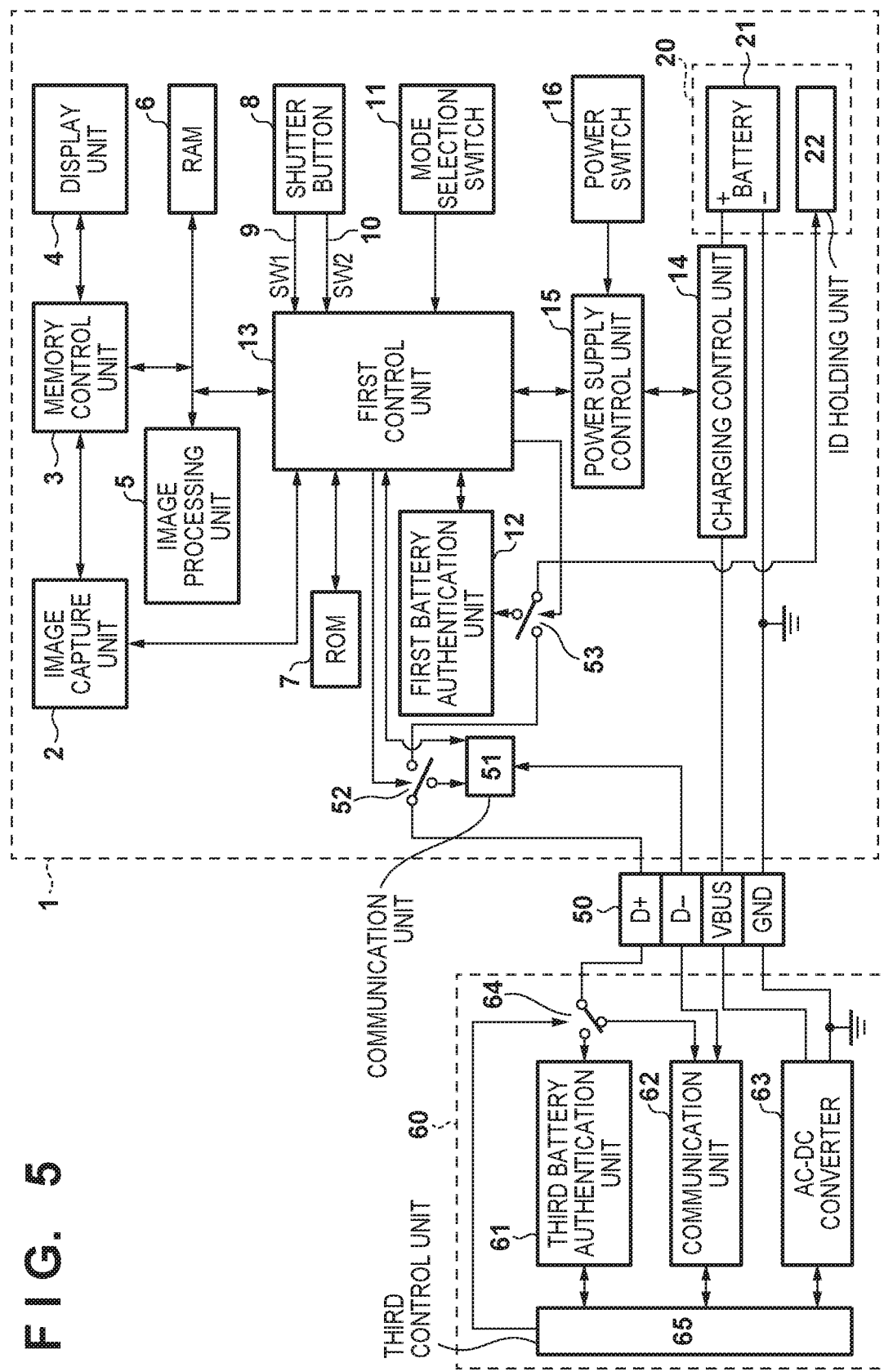
FIG. 5 is a block diagram illustrating components of an electronic apparatus 1 according to a second embodiment and components of an external power supply apparatus 60.

FIG. 5 is a block diagram illustrating components of the electronic apparatus 1 according to the second embodiment and components of the external power supply apparatus 60. In FIG. 5, components of the electronic apparatus 1 that have the same configurations or functions as components of the electronic apparatus 1 shown in FIG. 1 are assigned the same reference numerals as in FIG. 1, and descriptions thereof are omitted. Therefore, the second embodiment describes differences from the electronic apparatus 1 shown in FIG. 1.

Unlike in the electronic apparatus 1 according to the first embodiment, the power supply control unit 15 in the electronic apparatus 1 according to the second embodiment is connected to the first control unit 13. Furthermore, unlike the electronic apparatus 1 according to the first embodiment, the electronic apparatus 1 according to the second embodiment includes a communication unit 51 that communicates with the external power supply apparatus 60 via a USB (Universal Serial Bus) cable 50, a switch unit 52, and a switch unit 53. The external power supply apparatus 60 operates as, for example, an AC adapter (or an AC-USB adapter) that converts AC power to DC power, and supplies the electronic apparatus 1 with DC power via the USB cable 50. The external power supply apparatus 60 is detachable from the electronic apparatus 1.

In a state where the electronic apparatus 1 is connected to the external power supply apparatus 60 via the USB cable 50, the charging control unit 14 charges the battery 21, using power from the external power supply apparatus 60.

The communication unit 51 performs USB communication with a communication unit 62 via the USB cable 50. A D− line of the USB cable 50 is connected to the communication unit 51, and the connection target of a D+ line of the USB cable 50 is changed by the switch unit 52. The switch unit 52 changes the connection target of the D+ line of the USB cable 50 to the communication unit 51 or the ID holding unit 22 according to an instruction from the first control unit 13. The switch unit 53 changes the connection target of the ID holding unit 22 to the D+ line of the USB cable 50 or the first battery authentication unit 12 according to an instruction from the first control unit 13.

The USB cable 50 connects the electronic apparatus 1 and the external power supply apparatus 60 to each other, so that the communication unit 51 communicates with the external power supply apparatus 60 via the D+ line or the D− line, and the charging control unit 14 receives power from the external power supply apparatus 60 via a VBUS line. A GND line of the USB cable 50 connects the minus terminal of an AC-DC converter 63 and the minus terminal of the battery 21 to each other.

The communication unit 51 communicates with the communication unit 62, and thus the first control unit 13 controls power supplied from the external power supply apparatus 60 to charge the battery 21. In the second embodiment, the switch units 52 and 53 connects the D+ line to the first battery authentication unit 12 before the battery 21 is charged, and the first battery authentication unit 12 performs a battery authentication process regarding the battery pack 20.

The external power supply apparatus 60 includes a third battery authentication unit 61, the communication unit 62, the AC-DC converter 63, a switch unit 64, and a third control unit 65.

The third control unit 65 includes a memory that stores programs for controlling each of the components of the external power supply apparatus 60, and a processor that executes programs stored in the memory to control the components of the electronic apparatus 1. The processor of the third control unit 65 is a hardware processor, for example. The programs stored in the memory in the third control unit 65 include a program for controlling operations of the external power supply apparatus 60 described below.

The third battery authentication unit 61 performs a battery authentication process instead of the first battery authentication unit 12 while the first control unit 13 is performing an activation process. The communication unit 62 performs USB communication with the communication unit 51 via the USB cable 50. The D− line of the USB cable 50 is connected to the communication unit 62, and the connection target of the D+ line of the USB cable 50 is changed by the switch unit 64. The switch unit 64 changes the connection target of the D+ line of the USB cable 50 to the third battery authentication unit 61 or the communication unit 62 according to an instruction from the third control unit 65. The AC-DC converter 63 converts an AC voltage from an AC power supply to a predetermined DC voltage (e.g. 5 V). The switch unit 64 changes the connection target of the D+ line of the USB cable 50 to the communication unit 62 or the third battery authentication unit 61.

Figure 6:
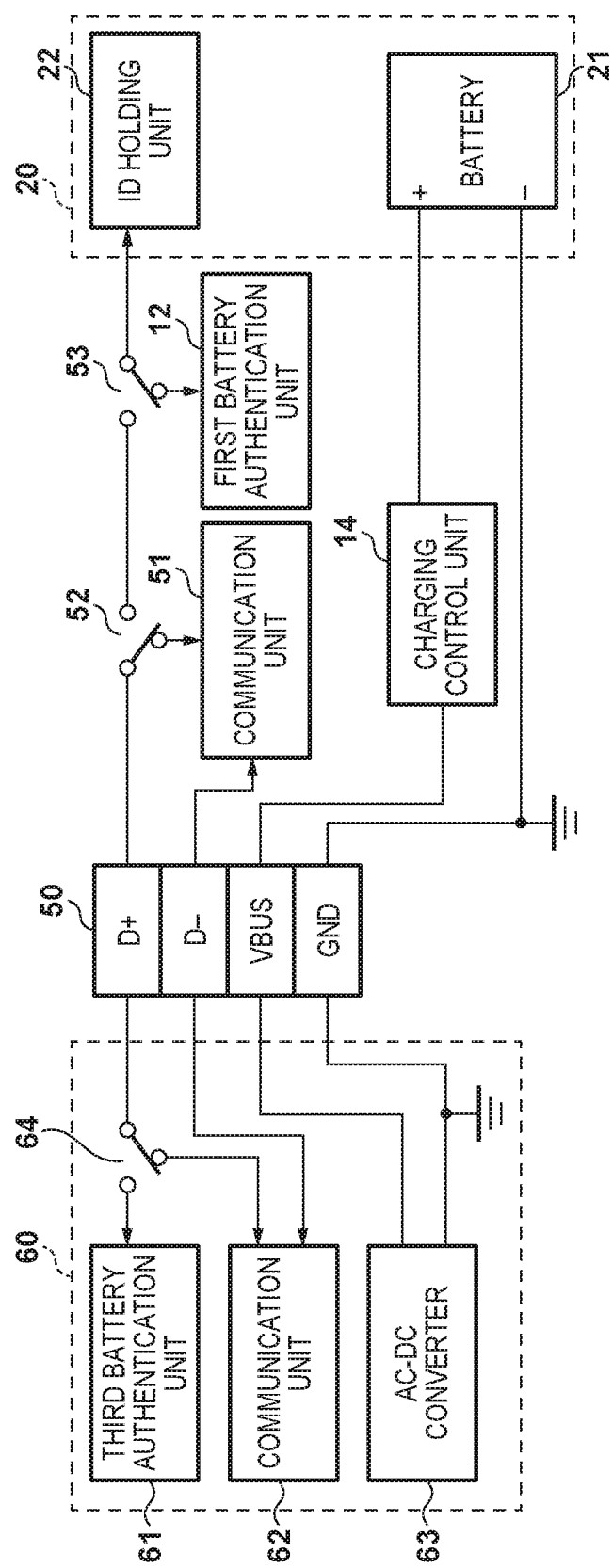
FIG. 6 is a diagram illustrating a connection state of the electronic apparatus 1 and the external power supply apparatus 60 in a case where an activation signal has not been input to the first control unit 13.
Figure 7:
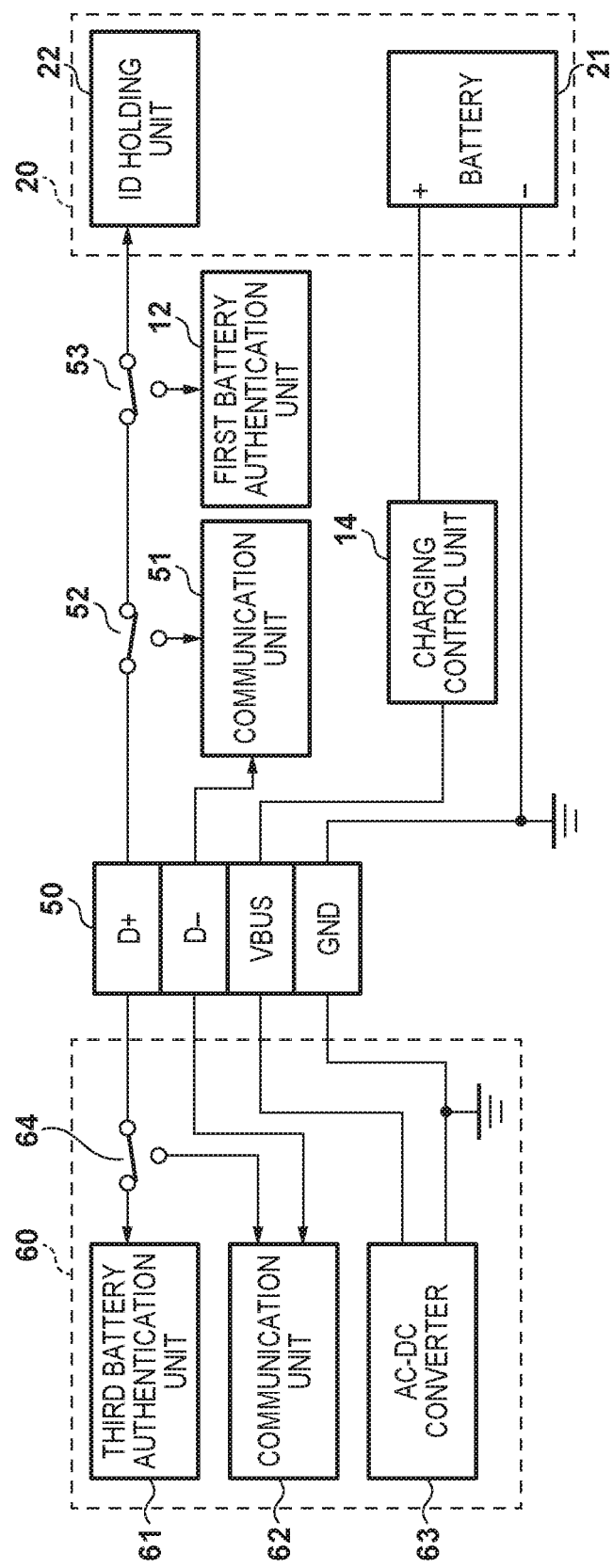
FIG. 7 is a diagram illustrating a connection state of the electronic apparatus 1 and the external power supply apparatus 60 in a case where an activation signal has been input to the first control unit 13.

Next, with reference to FIGS. 6 and 7, the following describes a connection state of the electronic apparatus 1 and the external power supply apparatus 60, which varies depending on whether or not an activation signal has been input to the first control unit 13. The first control unit 13 changes the connection targets of the switch units 52 and 53 according to whether or not an activation signal has been input thereto. The following describes a case where the electronic apparatus 1 and the external power supply apparatus 60 are connected to each other via the USB cable 50, and an activation signal that is input to the first control unit 13 is the signal RW, which indicates that an external apparatus is connected via the USB cable 50.

FIG. 6 is a diagram illustrating a connection state of the electronic apparatus 1 and the external power supply apparatus 60 in a case where an activation signal has not been input to the first control unit 13 according to the second embodiment.

As shown in FIG. 6, if an activation signal has not been input to the first control unit 13, the switch unit 52 connects the D+ line of the USB cable 50 to the communication unit 51. Also, the switch unit 53 connects the ID holding unit 22 to the first batter) authentication unit 12. In such a state, the communication unit 62 performs a communication process with the communication unit 51 so that connection between the communication unit 51 and the communication unit 62 is established. In this case, the switch unit 64 connects the D+ line of the USB cable 50 to the communication unit 62. A battery authentication process regarding the battery pack 20 is performed by the first battery authentication unit 12. If a battery authentication process is performed by the electronic apparatus 1, it takes only a short time. In contrast, if the battery authentication process is performed by the external power supply apparatus 60, a processing time varies. Therefore, if an activation signal has not been input to the first control unit 13, it is preferable that the battery authentication process is performed by the electronic apparatus 1.

FIG. 7 is a diagram illustrating a connection state of the electronic apparatus 1 and the external power supply apparatus 60 in a case where an activation signal has been input to the first control unit 13 according to the second embodiment.

As shown in FIG. 7, if an activation signal has been input to the first control unit 13, the switch unit 52 connects the D+ line of the USB cable 50 to the ID holding unit 22. Also, the switch unit 53 connects the ID holding unit 22 to the D+ line of the USB cable 50. Thus, the third battery authentication unit 61 and the ID holding unit 22 are connected to each other via the D+ line of the USB cable 50. The switch unit 64 connects the D+ line of the USB cable 50 to the third battery authentication unit 61.

As shown in FIG. 7, in a state where the third battery authentication unit 61 and the ID holding unit 22 are connected to each other via the D+ line of the USB cable 50, connection between the communication unit 62 and the communication unit 51 is not established. Therefore, the external power supply apparatus 60 switches the connection target of the switch unit 64 from the communication unit 62 to the third battery authentication unit 61, and the third battery authentication unit 61 performs a communication process with the ID holding unit 22 to perform the battery authentication process. Upon the third battery authentication unit 61 determining that the battery pack 20 is a genuine battery pack, the connection state is changed to that shown in FIG. 6, and the external power supply apparatus 60 notifies the first control unit 13 of the fact that the battery authentication process has been successful, via the communication unit 62 and the communication unit 51. Thereafter, the first control unit 13 instructs the charging control unit 14 to start charging the battery 21, and the charging control unit 14 starts charging the battery 21. As described above, if an activation signal has been input to the first control unit 13, the third battery authentication unit 61 performs a battery authentication process regarding the battery pack 20 instead of the first battery authentication unit 12. Thus, the activation process by the first control unit 13 and the battery authentication process by the external power supply apparatus 60 can be performed in parallel. Therefore, it is possible to shorten both the period of time required to complete the activation process and the period of time until charging starts.

Figure 8:
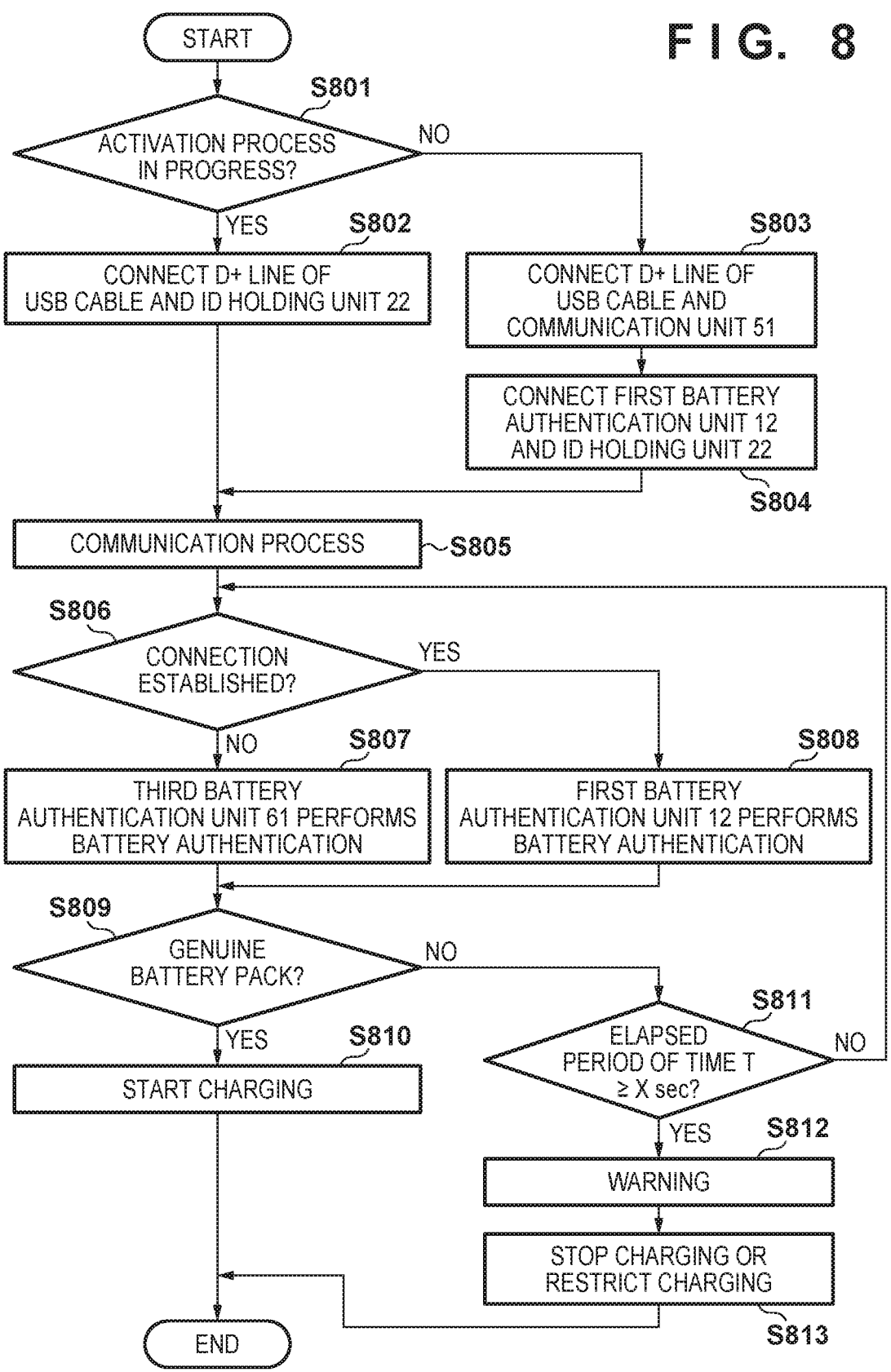
FIG. 8 is a flowchart illustrating a battery authentication process and a charging control process according to the second embodiment.

Next, with reference to FIGS. 8, 9, and 10, the following describes a battery authentication process and a charging control process according to the second embodiment.

FIG. 8 is a flowchart illustrating a battery authentication process and a charging control process according to the second embodiment.

The flowchart shown in FIG. 8 starts upon the user connecting the electronic apparatus 1 and the external power supply apparatus 60 to each other using the USB cable 50.

In step S801, the first control unit 13 determines whether or not an activation process is in progress. If an activation process is in progress, the first control unit 13 proceeds to step S802. If an activation process is not in progress, the first control unit 13 proceeds to step S803.

In step S802, the first control unit 13 controls the switch units 52 and 53 to connect the D+ line of the USB cable 50 and the ID holding unit 22 to each other.

In step S803, the first control unit 13 controls the switch unit 52 to connect the D+ line of the USB cable 50 and the communication unit 51 to each other.

In step S804, the first control unit 13 controls the switch unit 53 to connect the first battery authentication unit 12 and the ID holding unit 22 to each other.

In step S805, if the connection state is that shown in FIG. 6, the communication unit 62 and the communication unit 51 perform a communication process, and if the connection state is that shown in FIG. 7, the third battery authentication unit 61 and the ID holding unit 22 perform a communication process.

In step S806, the third control unit 65 determines whether or not it is possible to establish connection between the communication unit 51 and the communication unit 62. If it is determined that connection between the communication unit 51 and the communication unit 62 cannot be established, the third control unit 65 proceeds to step S807. If it is determined that connection between the communication unit 51 and the communication unit 62 can be established, the third control unit 65 proceeds to step S808.

In step S807, the third battery authentication unit 61 performs a battery authentication process regarding the battery pack 20 because the first control unit 13 is performing an activation process. Upon completion of the battery authentication process, the third battery authentication unit 61 notifies the third control unit 65. Upon completion of the activation process performed by the first control unit 13, the third control unit 65 notifies the first control unit 13 of the result of the battery authentication process via the communication unit 62 and the communication unit 51.

In step S808, the first battery authentication unit 12 performs a battery authentication process regarding the battery pack 20 because the first control unit 13 is not performing an activation process.

In step S809, the first control unit 13 determines whether or not the battery pack 20 is a genuine battery pack, based on the result of the battery authentication process performed in step S807 or S808. If it is determined that the battery pack 20 is a genuine battery pack, the first control unit 13 proceeds to step S810. If it is determined that the battery pack 20 is a non-genuine battery pack, the first control unit 13 proceeds to step S811.

In step S810, the first control unit 13 instructs the charging control unit 14 to start charging the battery 21.

In step S811, the first control unit 13 determines whether or not an elapsed period of time T that has elapsed after a battery authentication process has been started in step S807 or S808 has reached a predetermined period of time X. If it is determined that the elapsed period of time T of the battery authentication process has reached the predetermined period of time X (sec), the first control unit 13 proceeds to step S811. If it is determined that the elapsed period of time T has not reached the predetermined period of time X (sec), the first control unit 13 returns to step S806, and performs a retry operation to retry the battery authentication process.

In step S812, the first control unit 13 provides the user with a warning indicating that a non-genuine battery pack is used. This warning is provided by displaying, on the display unit 4, information indicating that a non-genuine battery pack is used.

In step S813, the first control unit 13 stops the charging control unit 14 from charging, or restricts the charging functions of the charging control unit 14.

Next, with reference to FIG. 9, the following describes operations of the external power supply apparatus 60, the electronic apparatus 1, and the battery pack 20 in a case where an activation signal has not been input to the first control unit 13.

In step S901, if an activation signal has not been input to the first control unit 13, the first control unit 13 switches the connection target of the switch unit 52 in step S902, to connect the D+ line of the USB cable 50 and the communication unit 51 to each other. Also, in step S903, the first control unit 13 switches the connection target of the switch unit 53, to connect the first battery authentication unit 12 and the ID holding unit 22 to each other.

In step S904, the communication unit 62 performs a communication process with the communication unit 51, and connection between the communication unit 51 and the communication unit 62 is established in step S905. Upon connection between the communication unit 51 and the communication unit 62 being established in step S905, the communication unit 51 notifies the first control unit 13 in step S906, of the fact that connection between the communication unit 51 and the communication unit 62 has been established. Upon the first control unit 13 being notified in step S906 of the fact that connection between the communication unit 51 and the communication unit 62 has been established, the first control unit 13 issues an authentication request to the first battery authentication unit 12 in step S907. Upon receiving the authentication request, the first battery authentication unit 12 makes a request to the ID holding unit 22 for the ID of the battery pack 20 (step S908). Upon receiving the ID request, the ID holding unit 22 transmits the ID of the battery pack 20 to the first battery authentication unit 12 (step S909). In step S910, the first battery authentication unit 12 compares the above-described two IDs with each other to determine whether or not the battery pack 20 is a genuine battery pack. In step S911, the first battery authentication unit 12 notifies the first control unit 13 of the result of the battery authentication process performed in step S910. The first control unit 13 determines whether or not the battery pack 20 is a genuine battery pack, based on the result of the battery authentication process. If it is determined that the battery pack 20 is a genuine battery pack, the first control unit 13 instructs the charging control unit 14 to start charging the battery 21 (step S912). In response to this instruction, the charging control unit 14 starts charging the battery 21. If it is determined that the battery pack 20 is a non-genuine battery pack, the first control unit 13 provides a predetermined warning, and stops the charging control unit 14 from charging, or restricts the charging functions of the charging control unit 14 (step S912).

Next, with reference to FIG. 10, the following describes operations of the external power supply apparatus 60, the electronic apparatus 1, and the battery pack 20 in a case where an activation signal has been input to the first control unit 13.

If the first control unit 13 is performing an activation process in step S1001, the first control unit 13 switches the connection target of the switch unit 52 in step S1002, to connect the D+ line of the USB cable 50 and the ID holding unit 22 to each other. The third control unit 65 switches the connection target of the switch unit 64 in step S1003, to connect the D+ line of the USB cable 50 and the third battery authentication unit 61 to each other. In step S1004, the third battery authentication unit 61 and the ID holding unit 22 perform a communication process. Upon successfully detecting the ID holding unit 22, the third battery authentication unit 61 makes a request to the ID holding unit 22 for the ID of the battery pack 20 (step S1005). Upon receiving the ID request, the ID holding unit 22 transmits the ID of the battery pack 20 to the third battery authentication unit 61 (step S1006). In step S1007, the third battery authentication unit 61 compares the two IDs with each other to determine whether or not the battery pack 20 is a genuine battery pack. In step S1008, the third battery authentication unit 61 notifies the third control unit 65 of the result of the battery authentication process performed in step S1007. Thereafter, upon the activation process performed by the first control unit 13 being complete in step S1009, the first control unit 13 switches the respective connection targets of the switch units 52 and 53, to connect the D+ line of the USB cable 50 and the communication unit 51 to each other, and to connect the first battery authentication unit 12 and the ID holding unit 22 to each other (steps S1010 and S1011). Thereafter, the communication unit 51 and the communication unit 62 perform a communication process (step S1012), and upon connection between the communication unit 51 and the communication unit 62 being established (step S1013), the communication unit 51 notifies the first control unit 13 of the fact that connection has been established (step S1014). Upon the first control unit 13 receiving a notification indicating that connection has been established, the first control unit 13 makes a request to the third control unit 65 for the result of the battery authentication process performed in step S1007 (step S1015). Upon a request for the result of battery authentication process being made, the third control unit 65 transmits the result of the battery authentication process performed in step S1007, to the first control unit 13 (step S1016). The first control unit 13 determines whether or not the battery pack 20 is a genuine battery pack, based on the result of the battery authentication process. If it is determined that the battery pack 20 is a genuine battery pack, the first control unit 13 instructs the charging control unit 14 to start charging the battery 21 (step S1017). In response to this instruction, the charging control unit 14 starts charging the battery 21. If it is determined that the battery pack 20 is a non-genuine battery pack, the first control unit 13 provides a predetermined warning, and stops the charging control unit 14 from charging, or restricts the charging functions of the charging control unit 14 (step S1017).

Although FIGS. 8, 9, and 10 illustrate an example in which the signal RW, which indicates that an external power supply apparatus is connected via the USB cable 50, is input as an activation signal, an activation signal is not limited to the signal RW, and another activation signal may be input.

As described above, according to the second embodiment, if an activation signal is input to the first control unit 13, the external power supply apparatus 60 connected via the USB cable 50 performs a battery authentication process regarding the battery pack 20, instead of the electronic apparatus 1. Thus, the activation process by the first control unit 13 and the battery authentication process by the external power supply apparatus 60 can be performed in parallel. Therefore, it is possible to shorten both the period of time required to complete the activation process and the period of time until charging starts.

Third Embodiment

Various functions, processes, or methods described in the first and second embodiments can also be implemented by a personal computer, a microcomputer, a CPU (Central Processing Unit), a processor, or the like by using a program. In the third embodiment, a personal computer, a microcomputer, a CPU (Central Processing Unit), a processor, or the like will be called a "computer X". Also, in the third embodiment, a program for controlling the computer X and implementing the various functions, processes, or methods described in the first and second embodiments will be called a "program Y".

The various functions, processes, or methods described in the first and second embodiments are implemented by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-145680, filed Jul. 27, 2017, which is hereby incorporated by reference herein in its entirety.

What is claimed is:

1. An electronic apparatus comprising:
a first control circuitry that performs an activation process excluding a battery authentication process for determining whether a battery pack connected to the electronic apparatus is a predetermined battery pack;
a second control circuitry that is separated from the first control circuitry;
a first battery authentication circuitry that is coupled to the first control circuitry and performs the battery authentication process; and
a second battery authentication circuitry that is coupled to the second control circuitry and performs the battery authentication process instead of the first battery authentication circuitry;
wherein the second control circuitry starts up a power supply voltage before the first control circuitry performs the activation process, causes the second battery authentication circuitry to perform the battery authentication process while the first control circuitry is performing the activation process, and provides a result of the battery authentication process performed by the second battery authentication circuitry to the first control circuitry.

2. The electronic apparatus according to claim 1, wherein a processing load on the second control circuitry is smaller than a processing load on the first control circuitry while the first control circuitry is performing the activation process.

3. The electronic apparatus according to claim 1, wherein the first control circuitry provides a warning indicating that the battery pack is a non-genuine battery pack, in a case where the battery pack is not determined as the predetermined battery pack based on the result of the battery authentication process performed by the second battery authentication circuitry.

4. The electronic apparatus according to claim 1, further comprising a power supply control circuitry that calculates a remaining amount of battery of the battery pack in a case where the battery pack is determined as the predetermined battery pack based on the result of the battery authentication process performed by the second battery authentication circuitry.

5. The electronic apparatus according to claim 1, wherein the battery pack includes a holding circuitry that holds identification information regarding the battery pack, and
the battery authentication process includes a process through which identification information stored in advance and identification information acquired from the battery pack are compared with each other and whether or not the battery pack is the predetermined battery pack is determined.

6. The electronic apparatus according to claim 1, wherein, in a case where the battery pack is not determined as the predetermined battery pack based on the result of the battery authentication process performed by the second battery authentication circuitry, the battery authentication process is performed again upon a predetermined period of time elapsing after the battery authentication process has been started.

7. The electronic apparatus according to claim 1, wherein the activation process excluding the battery authentication process is started upon a power switch of the electronic apparatus being turned ON.

8. The electronic apparatus according to claim 1, wherein the electronic apparatus is an apparatus that is capable of operating as an image capture apparatus.

9. A method comprising:
causing a first control circuitry to perform an activation process excluding a battery authentication process for determining whether a battery pack connected to an electronic apparatus is a predetermined battery pack; and
causing a second control circuitry separated from the first control circuitry to start up a power supply voltage before the first control circuitry performs the activation process;
causing a second battery authentication circuitry coupled to the second control circuitry to perform the battery authentication process instead of a first battery authentication circuitry coupled to the first control circuitry while the first control circuitry is performing the activation process; and
providing a result of the battery authentication process performed by the second battery authentication circuitry to the first control circuitry.

10. A non-transitory storage medium that stores a program causing a computer to execute a method, the method comprising:

causing a first control circuitry to perform an activation process excluding a battery authentication process for determining whether a battery pack connected to an electronic apparatus is a predetermined battery pack; and causing a second control circuitry separated from the first control circuitry to start up a power supply voltage before the first control circuitry performs the activation process;

causing a second battery authentication circuitry coupled to the second control circuitry to perform the battery authentication process instead of a first battery authentication circuitry coupled to the first control circuitry while the first control circuitry is performing the activation process; and providing a result of the battery authentication process performed by the second battery authentication circuitry to the first control circuitry.

11. The electronic apparatus according to claim 1, wherein the electronic apparatus is an apparatus that is capable of operating as a mobile phone.

\* \* \* \* \*